(12) United States Patent
Veres et al.

(10) Patent No.: US 6,614,790 B1
(45) Date of Patent: Sep. 2, 2003

(54) ARCHITECTURE FOR INTEGRATED SERVICES PACKET-SWITCHED NETWORKS

(75) Inventors: András Veres, Budapest (HU); Zoltán Turányi, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/330,218

(22) Filed: Jun. 11, 1999

(30) Foreign Application Priority Data

Jun. 12, 1998 (GB) .............................. 9812789

(51) Int. Cl.[7] .............................................. H04L 12/56
(52) U.S. Cl. ................... 370/395.2; 370/395.21
(58) Field of Search ................... 370/412, 413, 370/414, 415, 416, 417, 418, 395.2, 395.21

(56) References Cited

U.S. PATENT DOCUMENTS

| | | | | |
|---|---|---|---|---|
| 5,917,804 A | * | 6/1999 | Shah et al. ................. | 370/320 |
| 5,926,458 A | * | 7/1999 | Yin ............................. | 370/230 |
| 6,097,722 A | * | 8/2000 | Graham et al. ............. | 370/395 |
| 6,104,700 A | * | 8/2000 | Haddock et al. ............ | 370/235 |
| 6,240,066 B1 | * | 5/2001 | Nagarajan ................... | 370/230 |
| 6,269,079 B1 | * | 7/2001 | Marin et al. ................ | 370/230 |
| 6,324,165 B1 | * | 11/2001 | Fan et al. ................... | 370/232 |

* cited by examiner

*Primary Examiner*—Ken Vanderpuye

(57) ABSTRACT

A switching node 3 for providing admission control in a network comprises a number of separate priority queues 6 for receiving packets having different priority levels. Priority levels 1 to n provide guaranteed delay services, priority levels n+1 to m provide guaranteed loss services, and priority level $P_{m+1}$ provides best effort service. Measuring means $5_1$ to $5_m$ continually measure the average bit rate entering each priority level buffer $P_1$ to $P_m$, except the lowest $P_{m+1}$. When a request arrives with a kth priority level, the network capacities for priority levels l=k . . . $P_m$ are calculated. For all choices of l, the measurements of traffic loads of levels l and higher are taken into account. These capacity requirements are necessary to guarantee the quality of service for all flows already admitted to the lower priority queues. These capacities are compared to the network capacity, and if there is sufficient capacity, the request is accepted. Otherwise, the request in rejected.

20 Claims, 3 Drawing Sheets

ARCHITECTURE FOR INTEGRATED SERVICES PACKET-SWITCHED NETWORKS

TECHNICAL FIELD

The invention relates to a service architecture for a telecommunication network, in particular, an Integrated Services Packet-Switched Networks which makes it possible to support different applications requiring different levels of quality-of-service (QoS).

TECHNICAL BACKGROUND

The current trend of integrating communication networks requires the development of network architectures that are capable of supporting the diverse range of quality-of-service needs that are required for a diverse range of different applications. Applications differ in the traffic they generate and the level of data loss and delay they can tolerate. For example, audio data does not require the packet-error reliability required of data services, but audio data cannot tolerate excessive delays. Other applications can be sensitive to both data loss and delay.

The network architectures under consideration are based on the packet (or cell) switching paradigm, for example Transmission Control Protocol/Internet Protocol (TCP/IP) or Asynchronous Transfer Mode (ATM). The basic idea behind integrated services packet-switched networks is that all traffic is carried over the same physical network but the packets belonging to flows with different QoS requirements receive different treatment in the network. A flow represents a stream of packets having a common traffic (e.g. peak rate) and QoS (e.g. loss) description, and also having the same source and destination.

This differentiation in treatment is generally implemented by a switch mechanism that first classifies packets arriving at a Switching Node (SN) according to their QoS commitment, and then schedules packets for transmission based on the result of the classification. Ideally, the classifier and scheduler in each switching node should be simple, fast, scalable and cheap.

In order to protect existing commitments, the network must be able to refuse any new request. This is accomplished using Admission Control (AC) during which some mechanism (usually distributed) decides whether the new request can be admitted or not.

Among the several proposed solutions to the problem, they can be categorised into two main groups depending upon whether or not they have what is known as "per-flow" scheduling.

FIG. 1 shows a known solution based on per-flow scheduling. This type of system has a scheduling algorithm which maintains a per-flow state, and the amount of work to be done depends on the number of the flows. A dynamic queue/memory handler 13 assigns a separate buffer $Q_1$ to $Q_n$ for each flow. Each different source provides a descriptor of its traffic in advance, limiting the amount of load sent into the network. The network decides using admission control 12 whether it should accept a new request. After admission, an edge device, (being a function on the boundary of a trusted region of a service provider which acts as a checking point towards another service provider or subscriber), polices the traffic of the source. A typical example of the policing used is Weighted Fair Queuing (WFQ) or similar variants.

Solutions which use this form of per-flow scheduling have the disadvantage of requiring complex queue handlers and classifying/scheduling hardware. For each packet, the classifier 10 must determine the corresponding buffer $Q_1$ to $Q_n$ that the packet should be put into. The large and variable number of queues means that the queue handler's function is complex. When the next packet is to be sent, the scheduler 14 must select the appropriate buffer to send from. The scheduler 14 can also be a bottleneck due to the large number of queues it must service. The per-packet processing cost can be very high and increases with the number of flows. In addition, the algorithms are not scalable, which means that as the volume and the number of flows increases, the processing complexity increases beyond what can be handled.

FIG. 2 shows another known solution based on a system where there is no per-flow scheduling. This type of solution provides some fixed, predefined QoS classes. The scheduling is not based upon the individual flows but on the QoS class of the packets. This type of method requires simpler hardware. A separate queue $Q_1$ to $Q_n$ is provided for each QoS class. The packet classifier 15 classifies the incoming packets into the appropriate QoS queue, $Q_1$ to $Q_n$. This solution either tries to ensure better service to premium users, or explicit deterministic guarantees.

Proposed solutions which do not use per-flow scheduling have one of two limitations. First, they are able to provide only very loose QoS guarantees. In addition, the QoS metric values are not explicitly defined, (e.g. differential services architectures). Secondly, the provided guarantees are deterministic, which means that no statistical multiplexing gain can be exploited. As a result, the network utilisation is very low.

The aim of the present invention is to overcome the disadvantages of the prior art listed above by providing a service architecture having a simple and scalable way to guarantee different levels of quality-of-service in an integrated services packet-switched network. This is achieved using switching nodes that combine simple packet scheduling and measurement based admission control to provide explicit quality-of-service guarantees.

SUMMARY OF THE INVENTION

According to a first aspect of the present invention, there is provided an admission control method for a switching node of an integrated services packet-switched network, the method comprising the steps of:

allocating each incoming flow to a respective selected one of the plurality of priority levels, based on service guarantees required by said flow;
 determining whether, if the incoming flow is admitted, the service guarantees can be met for the incoming flow and all previously admitted flows; and, if so,
 admitting the incoming flow.

According to another aspect of the invention, a switching node comprises:

means for allocating each incoming flow to a respective one of the priority levels, based on service guarantees required by said flow;
 admission control means for determining whether, if the incoming flow is admitted, the service guarantees can be met for the incoming flow and all previously admitted flows; and,
 means for admitting the incoming flow if this is so.

According to a further aspect of the invention, an integrated services packet switched network comprises a plurality of switching nodes, wherein at least one switching node comprises:

means for allocating each incoming flow to a respective one of the priority levels, based on service guarantees required by said flow;

admission control means for determining whether, if the incoming flow is admitted, the service guarantees can be met for the incoming flow and all previously admitted flows; and, means for admitting the incoming flow if this is so.

BRIEF DESCRIPTION OF THE DRAWINGS

For a better understanding of the present invention reference will now be made, by way of example, to the accompanying drawings, in which.

DETAILED DESCRIPTION OF A PREFERRED EMBODIMENT OF THE INVENTION

The integrated services packed-switched network of the preferred embodiment offers three service categories. These are:

i. maximum delay guaranteed, ii. maximum guaranteed packet loss, and iii. best effort.

Within the delay and loss categories there are a fixed number of services. For services in the delay category the network provides different levels of maximum guaranteed delay (d1, d2, . . . ) and strict loss guarantee, while for services in the loss category different levels of maximum guaranteed loss (l1, l2, . . . ) are provided, but no explicit delay. For the best effort service no guarantees are given at all, but no admission control is performed either. This means that all bandwidth left unused by the other services can be exploited.

Figure 1:
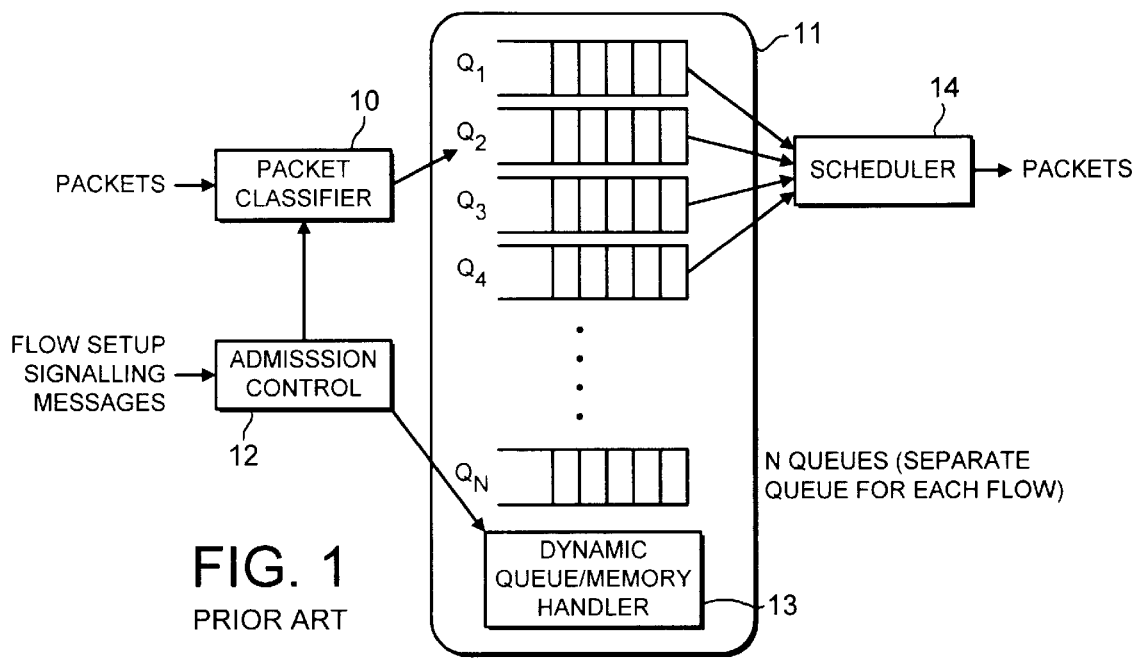
FIG. 1 shows an admission control system based on per-flow scheduling according to the prior art.
Figure 2:
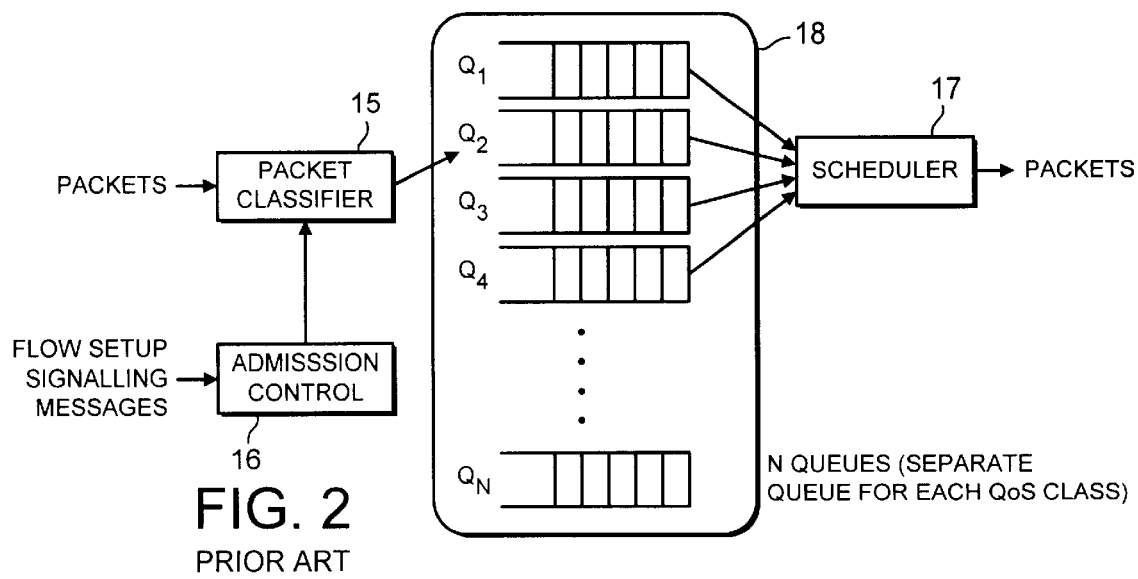
FIG. 2 shows an admission control system having no per-flow scheduling according to the prior art.
Figure 3:
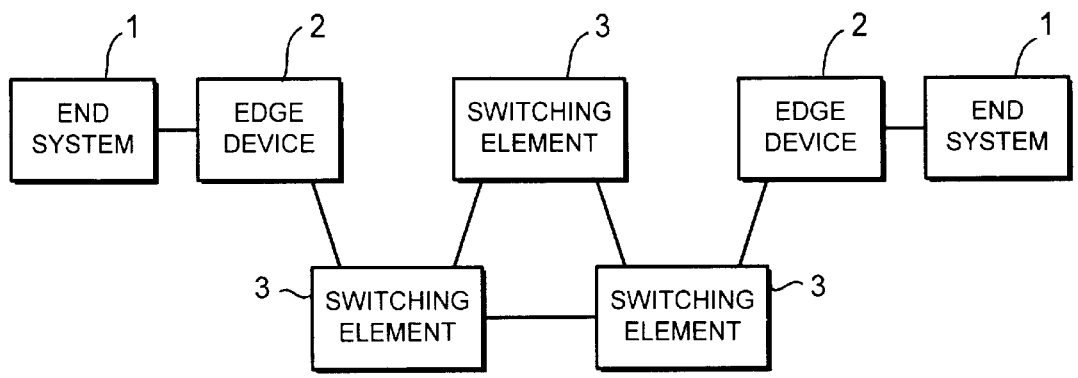
FIG. 3 shows a block diagram of the network entities constituting the service architecture according to an embodiment of the present invention.

FIG. 3 shows the network elements forming the network architecture of the present invention. The network consists of end systems 1 that are connected to edge devices 2. Each end system 1 signals with its associated edge device to set up and tear down packet flows, and to generate the traffic for the admitted flows.

The edge devices are in turn connected to switching nodes 3. The purpose of each edge device 2 is to police the traffic of the admitted connections, and ensure that the service fields in the packet headers are set to the service class of the connection.

The operation of the network relies on a signalling protocol which communicates a new request from the end system to the network and among network nodes. The signalling protocol also signals the acceptance or rejection of a request, and the termination of the request from the end system. The exact protocol to be used does not form part of this invention, so long as it meets the criteria set out above.

In operation, an end system 1 signals a request for a new flow to an edge device 2. The signalling message contains the service descriptor and the traffic descriptor. The traffic descriptor may contain a peak rate or a leaky bucket descriptor, or both. The edge device 2 passes the request along the path of the flow and each switching node 3 makes an admission control decision locally. Rejection or acceptance of a request is signalled back to the end system 1.

If the flow was accepted the end system 1 starts to transmit data to the edge device 2. The edge device 2 is responsible for identifying the flow which the packet belongs to. It checks if the packet conforms to the flow's traffic descriptor. If not, the edge device 2 drops the packet. If the packet conforms, the edge device assigns a priority level to the packet based on the QoS requirements of the flow. The priority level is stored in the packet header (for example, the TOS field in IP packets or the VPI/VCI field in ATM cells). The packet travels along the path to its destination. In each switching node 3 the packet is sent to the queue corresponding to the value in the packet header. Queues are serviced on a strict priority basis, thereby conserving the work of the scheduler.

Figure 4:
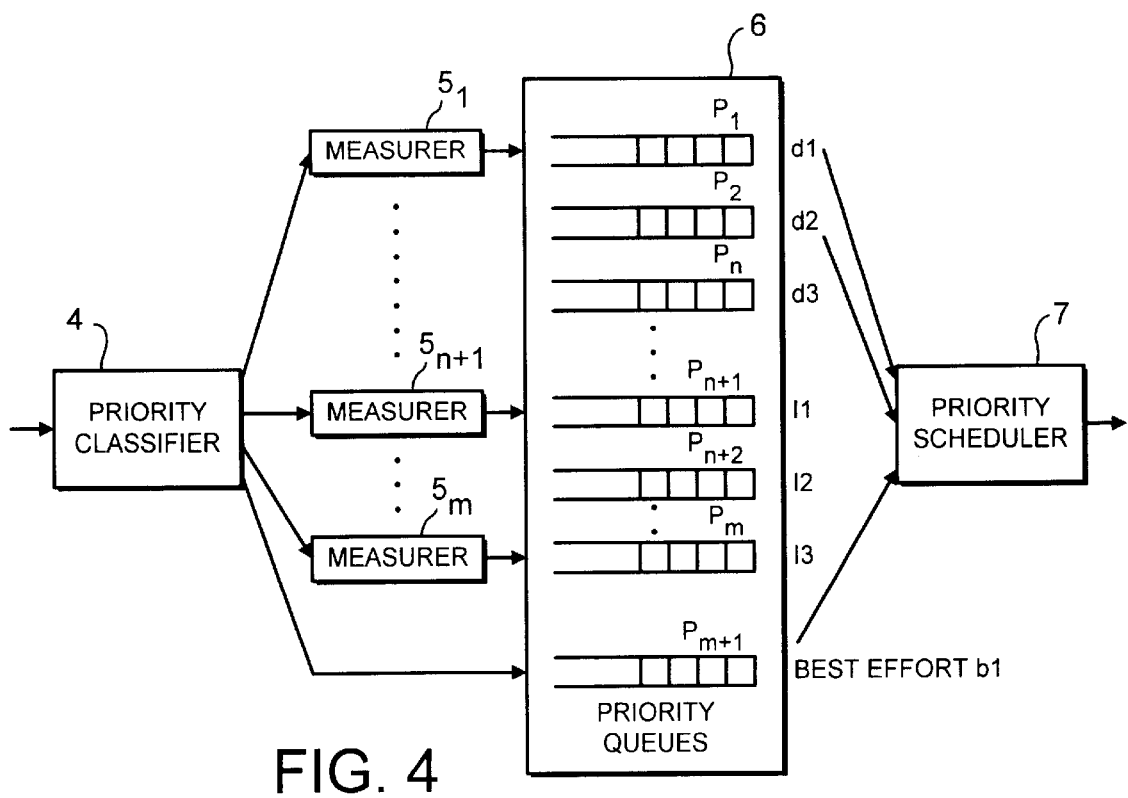
FIG. 4 shows a switching node having admission control according to the present invention.

FIG. 4 shows a preferred embodiment of a switching node providing admission control according to the present invention.

A priority classifier 4 assigns priorities based on the service request of the flow, which is communicated in the service descriptor in the signalling messages. Admitted packets are sent to a number of separate priority queues 6 depending upon the value contained in the packet header. The services within the "delay" service category always receive higher priority than services in the "loss" service category. Priority levels 1 to n provide guaranteed delay services, and priority levels n+1 to m provide guaranteed loss services. Within each type of category, the more stringent services receive higher priority than less stringent ones.

For example, d1 has a more demanding service guarantee, and hence a higher priority level, than d2, which is higher than d3, and so on. Likewise, within the loss category, l1 has a more demanding service guarantee, and hence a higher priority, than l2, which has a higher priority than l3, and so on. The best effort service is always assigned the lowest priority level $P_{m+1}$.

The switching node 3 has means $5_1$ to $5_m$ for continually measuring the average bit rate entering each priority level buffer $P_1$ to $P_m$, except the lowest $P_{M+1}$. These measurements are used to aid the admission control algorithm of the present invention.

Figure 5:
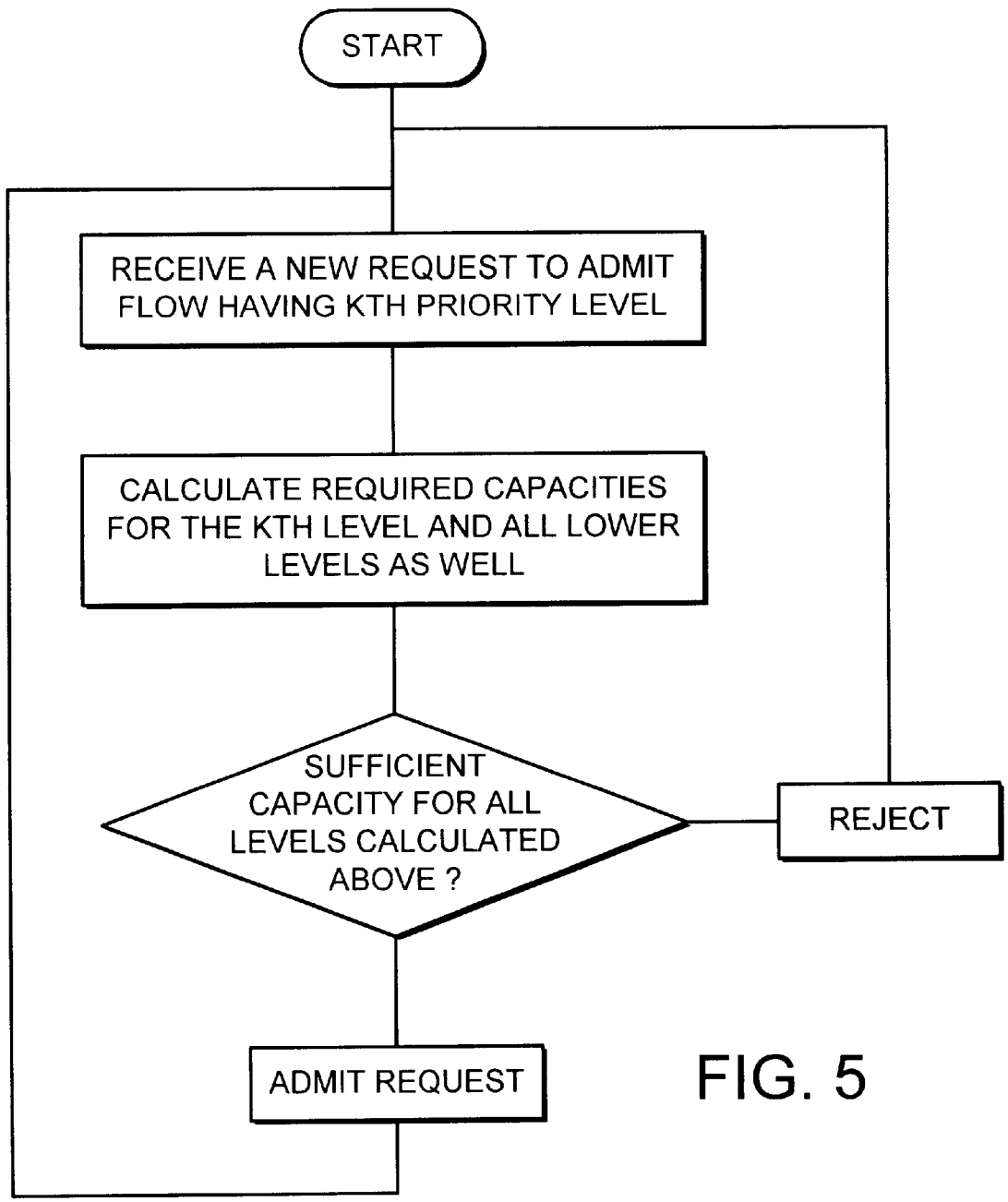
FIG. 5 is a flow diagram illustrating the steps involved in admitting a new call request in the admission control method according to the present invention.

FIG. 5 shows the steps involved in the admission control method of the present invention.

When a request arrives with the kth priority level, the network capacities for priority levels l=k . . . $P_m$ are calculated, as shown in step S2. For all choices of l, the measurements of traffic loads of levels l and higher are taken into account. These capacity requirements are necessary to guarantee the quality of service for all flows already admitted to the lower priority queues. These capacities are compared to the network capacity, step S3, and if there is sufficient capacity, step S4, the request is accepted, step S5. Otherwise, the request in rejected, step S6.

Thus, for example, if there are 10 admitted flows on each priority $P_1$ to $P_{m+1}$, and a new request arrives with the 3rd priority level $P_3$, then the admission control means determines if all 31 flows, those in $P_1$–$P_3$ and the new flow, can be guaranteed d3 delay using the whole link capacity. If the request arrives at the 6th priority level and this is the queue for loss service with guarantee l2, then the admission control means determines if l2 loss can be guaranteed to all of the 61 flows, namely those in $P_1$–$P_6$ and the new flow. This guarantees the quality of service for the kth level. However, it must be assured that the service guarantees for the lower priority levels can also be met. Therefore, as stated above, when a request is received, the capacity required for the kth level and lower levels is calculated. The new request is admitted if there is sufficient capacity for the kth level and all lower priority levels.

In this manner, the disadvantages of prior art priority scheduling techniques are avoided, thereby preventing the higher priority traffic from severely blocking the lower priority traffic.

Preferably, admission control for the guaranteed delay services relies on the following condition being met:

$$\rho_0 + \sum_{i=1}^{k} M_i + \frac{1}{d_k} \sqrt{\frac{-\ln(\varepsilon_d)}{2}\left((\sigma_0 + \rho_0 d_k)^2 + \sum_{i \in A_{1\ldots k}} (\sigma_i + \rho_i d_k)^2\right)} < C$$

where:
$\rho_0$, $\sigma_0$ the token rate and bucket size of the new flow
k assigned priority level of the new flow
$\varepsilon_d$ saturation probability (should be smaller than the loss values l1, l2, l3, . . . , e.g. $10^{-8}$)
$\rho_i$, $\sigma_i$ token rate and bucket size of flow i
$A_{1\ldots k}$ set of flows belonging to the first k (1 . . . k) priority levels
C output link rate
$M_i$ measured average rate of priority level i
$d_k$ delay guarantee of priority level k Preferably, admission control for the guaranteed loss services relies on the following two conditions being met:

$$\rho_0 + \sum_{i=1}^{k} M_i + \sqrt{\frac{-\ln(l_{k-n})}{2}\left(\rho_0^2 + \sum_{i \in A_{1\ldots k}} \rho_i^2\right)} < C \quad \text{Condition 1}$$

$$\sqrt{\frac{-\ln(l_{k-n})}{2}\left(\sigma_0^2 + \sum_{i \in A_{1\ldots k}} \sigma_i^2\right)} < B_k \quad \text{Condition 2}$$

where:
$\rho_0$, $\sigma_0$ the token rate and bucket size of the new flow
k assigned priority level of the new flow
$l_i$ saturation probability of guaranteed loss service i
$\rho_i$, $\sigma_i$ token rate and bucket size of flow i
$A_{1\ldots k}$ set of flows belonging to the first k (1 . . . k) priority levels
C output link rate
$B_k$ buffering capacity at queue k
$M_i$ measured average rate of priority level i After flows have been admitted according to the admission control criteria listed above, a priority scheduler 7 (shown in FIG. 4) services the queues on a strict priority basis to output the packets from the switching node.

The admission control method described above overcomes the problems of the prior art in that the admission algorithm is scalable, ie. does not depend upon the number of different priority levels, and does not allow the higher priority traffic to severely block the lower priority traffic.

The invention has the advantage that the amount of work required per-packet in the scheduler is minimal. The architecture is able to admit more flows than schemes based on WFQ, and statistical multiplexing can be done among several traffic classes which increases the amount of traffic that can be admitted.

When admitting to the kth priority, the invention will consider as if all the higher priority traffic belonged to this class. In this way, admission control is not carried out in separate classes, but in groups of classes, thereby increasing the statistical multiplexing gain. The scalable, aggregate level measurements used to monitor the real usage of the network resources means that network efficiency is improved.

What is claimed is:

1. An admission control method for a switching node in an Integrated Services Packet-Switched Network having a plurality of priority levels based on services guarantees associated therewith, the method comprising the steps of:

allocating each incoming flow to a respective selected one of the plurality of priority levels, based on service guarantees required by each said incoming flow;

determining whether, if an incoming flow is admitted, the service guarantees can be met for the incoming flow and all previously admitted flows; and calculating capacities that are required for the incoming flow and all lower priority flows having guaranteed services, and admitting the incoming flow if there is sufficient network capacity to handle the sum of said capacities.

2. A method as claimed in claim 1 wherein the step of calculating the required capacity for each flow involves taking into account traffic load measurements for a particular flow and all higher priority flows.

3. A method as claimed in claim 2 wherein the plurality of priority levels relate to flows requiring guaranteed delay services, flows requiring guaranteed loss services, and, flows requiring best effort services.

4. A method as claimed in claim 3 wherein priority levels 1 to n are assigned to the flows requiring guaranteed delay services, priority levels n+1 to m are assigned to the flows requiring guaranteed loss services, and a priority level m+1 is assigned to the flows requiring best effort services.

5. A method as claimed in claim 4 wherein admission control for the guaranteed delay services relies on the following condition being met:

$$\rho_0 + \sum_{i=1}^{k} M_i + \frac{1}{d_k} \sqrt{\frac{-\ln(\varepsilon_d)}{2}\left((\sigma_0 + \rho_0 d_k)^2 \sum_{i \in A_{1\ldots k}} (\sigma_i + \rho_i d_k)^2\right)} < C$$

where:
$\rho_0$, $\sigma_n$ the token rate and bucket size of the new flow
k assigned priority level of the new flow
$\varepsilon_d$ saturation probability (should be smaller than the loss values l1, l2, l3, . . . , e.g. $10^{-8}$)
$\rho_i$, $\sigma_i$ token rate and bucket size of flow i
$A_{1\ldots k}$ set of flows belonging to the first k (1 . . . k) priority levels
C output link rate
$M_i$ measured average rate of priority level i
$d_k$ delay guarantee of priority level k.

6. A method as claimed in claim 1 wherein admission control for the guaranteed loss services relies on the following two conditions being met:

$$\rho_0 + \sum_{i=1}^{k} M_i + \sqrt{\frac{-\ln(I_{k-n})}{2}\left(\rho_0^2 + \sum_{i \in A_{1 \ldots k}} \rho_i^2\right)} < C; \text{ and} \qquad \text{Condition 1}$$

$$\sqrt{\frac{-\ln(I_{k-n})}{2}\left(\sigma_0^2 + \sum_{i \in A_{1 \ldots k}} \sigma_i^2\right)} < B_k; \qquad \text{Condition 2}$$

where:
- $\eta_0, \sigma_0$ the token rate and bucket size of the new flow
- k assigned priority level of the new flow
- $l_i$ saturation probability of guaranteed loss service i
- $\eta_i, \sigma_i$ token rate and bucket size of flow i
- $A_{1 \ldots k}$ set of flows belonging to the first k (1 ... K) priority levels
- C output link rate
- $B_k$ buffering capacity at queue k
- $M_i$ measured average rate of priority level i.

7. A switching node for an Integrated Services Packet-Switched Network having a plurality of priority levels based on service guarantees associated therewith, the switching node comprising:
- means for allocating each incoming flow to a respective one of the priority levels, based on service guarantees required by each said incoming flow;
- admission control means for determining whether, if an incoming flow is admitted, the service guarantees can be met for the incoming flow and all previously admitted flows;
- means for calculating capacities that are required for the incoming flow and all lower priority flows having guaranteed services; and
- means for admitting the incoming flow if there is sufficient network capacity to handle the sum of said capacities.

8. A switching node as claimed in claim 7, wherein said node is capable of calculating the required capacity for each flow, which involves taking into account traffic load measurements for a particular flow and all higher priority flows.

9. A switching node as claimed in claim 8 wherein the plurality of priority levels relate to flows requiring guaranteed delay services, flows requiring guaranteed loss services, and flows requiring best effort services.

10. A switching node as claimed in claim 9 wherein priority levels 1 to n are assigned to the flows requiring guaranteed delay services, priority levels n+1 to m are assigned to the flows requiring guaranteed loss services, and a priority level m+1 is assigned to the flows requiring best effort services.

11. A switching node as claimed in claim 10 wherein:
- queues 1 to n are provided for storing the guaranteed delay service data;
- queues n+1 to m are provided for storing the guaranteed loss service data; and
- a queue m+1 is provided for storing best effort service data.

12. A switching node according to claim 11 wherein the admission control means admits the guaranteed delay services if the following condition are met:

$$\rho_0 + \sum_{i=1}^{k} M_i + \frac{1}{d_k}\sqrt{\frac{-\ln(\varepsilon_d)}{2}\left((\sigma_0 + \rho_0 d_k)^2 + \sum_{i \in A_{1 \ldots k}} (\sigma_i + \rho_i d_k)^2\right)} < C$$

Where:
- $\eta_0, \sigma_0$ the token rate and bucket size of the new flow
- k assigned priority level of the new flow
- $\varepsilon_d$ saturation probability (should be smaller than the loss values 11, 12, 13, ..., e.g. 10)
- $\eta_i, \sigma_i$ token rate and bucket size of flow i
- $A_{1 \ldots k}$ set of flows belonging to the first k (1 ... k) priority levels
- C output link rate
- $M_i$ measured average rate of priority level i
- $d_k$ delay guarantee of priority level k.

13. A switching node according to claim 7 wherein the admission control means admits the guaranteed loss services if the following two conditions are met:

$$\rho_0 + \sum_{i=1}^{k} M_i + \sqrt{\frac{-\ln(I_{k-n})}{2}\left(\rho_0^2 + \sum_{i \in A_{1 \ldots k}} \rho_i^2\right)} < C; \text{ and} \qquad \text{Condition 1}$$

$$\sqrt{\frac{-\ln(I_{k-n})}{2}\left(\sigma_0^2 + \sum_{i \in A_{1 \ldots k}} \sigma_i^2\right)} < B_k. \qquad \text{Condition 2}$$

where:
- $\eta_0, \sigma_0$ the token rate and bucket size of the new flow
- k assigned priority level of the new flow
- $l_i$ saturation probability of guaranteed loss service i
- $\eta_i, \sigma_i$ token rate and bucket size of flow i
- $A_{1 \ldots k}$ set of flows belonging to the first k (1 ... K) priority levels
- C output link rate
- $B_k$ buffering capacity at queue k
- $M_i$ measured average rate of priority level i.

14. An Integrated Services Packet-Switched Network having a plurality of priority levels based on service guarantees associated therewith, the network comprising a plurality of switching nodes, wherein at least one switching node comprises:
- means for allocating each incoming flow to a respective one of the priority levels, based on service guarantees required by each said incoming flow;
- admission control means for determining whether, if an incoming flow is admitted, the service guarantees can be met for the incoming flow and all previously admitted flows;
- means for calculating capacities required for the incoming flow and all lower priority flows having guaranteed services; and
- means for admitting the incoming flow if there is sufficient network capacity to handle the sum of said capacities.

15. An Integrated Services Packet-Switched Network as claimed in claim 14, wherein said at least one switching node calculates the required capacity for each flow by taking into account traffic load measurements for a particular flow and all higher priority flows.

16. An Integrated Services Packet-Switched Network as claimed in claim 15 wherein the plurality of priority levels relate to flows requiring guaranteed delay services, flows requiring guaranteed loss services, and flows requiring best effort services.

17. An Integrated Services Packet-Switched Network as claimed in claim 16 wherein priority levels 1 to n are assigned to the flows requiring guaranteed delay services, priority levels n+1 to m are assigned to the flows requiring guaranteed loss services, and a priority level m+1 is assigned to the flows requiring best effort services.

18. An Integrated Services Packet-Switched Network as claimed in claim 17 wherein:
   queues 1 to n are provided for storing the guaranteed delay service data;
   queues n+1 to m are provided for storing the guaranteed loss service data; and
   a queue m+1 is provided for storing best effort service data.

19. An Integrated Services Packed-Switched Network according to claim 18, wherein the admission control means admits the guaranteed delay services if the following condition is met:

$$\rho_0 + \sum_{i=1}^{k} M_i + \frac{1}{d_k}\sqrt{\frac{-\ln(\varepsilon_d)}{2}\left((\sigma_0 + \rho_0 d_k)^2 + \sum_{i \in A_{1\ldots k}} (\sigma_i + \rho_i d_k)^2\right)} < C$$

where:
   $\eta_0$, $\sigma_0$ the token rate and bucket size of the new flow
   k assigned priority level of the new flow
   $\varepsilon_d$ saturation probability (should be smaller than the loss values 11, 12, 13, . . . ,e.g. $10^{-8}$)
   $\eta_i$, $\sigma_i$ token rate and bucket size of flow i
   $A_{1 \ldots k}$ set of flows belonging to the first k (1 . . . k) priority levels
   C output link rate
   $M_i$ measured average rate of priority level i
   $d_k$ delay guarantee of priority level k.

20. An Integrated Services Packed-Switched Network according to claim 18, wherein the admission control means admits the guaranteed loss services if the following two conditions are met:

$$\rho_0 + \sum_{i=1}^{k} M_i + \sqrt{\frac{-\ln(l_{k-n})}{2}\left(\rho_0^2 + \sum_{i \in A_{1\ldots k}} \rho_i^2\right)} < C; \text{ and} \quad \text{Condition 1}$$

$$\sqrt{\frac{-\ln(l_{k-n})}{2}\left(\sigma_0^2 + \sum_{i \in A_{1\ldots k}} \sigma_i^2\right)} < B_k \quad \text{Condition 2}$$

where:
   $\eta_0$, $\sigma_0$ the token rate and bucket size of the new flow
   k assigned priority level of the new flow
   $l_i$ saturation probability of guaranteed loss service i
   $\eta_i$, $\sigma_i$ token rate and bucket size of flow i
   $A_{1 \ldots k}$ set of flows belonging to the first k (1 . . . K) priority levels
   C output link rate
   $B_k$ buffering capacity at queue k
   $M_i$ measured average rate of priority level i.

* * * * *